United States Patent
Humphrey et al.

(10) Patent No.: US 7,169,296 B2
(45) Date of Patent: *Jan. 30, 2007

(54) COLLAPSIBLE DIGESTER

(75) Inventors: Mary Humphrey, 357 Chestnut, Carlsbad, CA (US) 92008; John B. Rice, New Orleans, LA (US)

(73) Assignee: Mary Humphrey, Carlsbad, CA (US)

( * ) Notice: Subject to any disclaimer, the term of this patent is extended or adjusted under 35 U.S.C. 154(b) by 258 days.

This patent is subject to a terminal disclaimer.

(21) Appl. No.: 10/892,505

(22) Filed: Jul. 15, 2004

(65) Prior Publication Data

US 2004/0251189 A1   Dec. 16, 2004

Related U.S. Application Data

(63) Continuation of application No. 10/241,260, filed on Sep. 10, 2002, now Pat. No. 6,887,374.

(51) Int. Cl.
*B01D 12/00* (2006.01)
(52) U.S. Cl. .............. 210/150; 210/151; 210/220; 210/232; 210/239; 210/532.2
(58) Field of Classification Search ............ 210/150, 210/151, 220, 232, 239, 532.2
See application file for complete search history.

(56) References Cited

U.S. PATENT DOCUMENTS

| 3,306,447 A | 2/1967 | Medeiros |
|---|---|---|
| 3,318,449 A | 5/1967 | Jennings et al. |
| 3,543,294 A | 11/1970 | Boester |
| 3,666,106 A | 5/1972 | Green |
| 3,810,544 A | 5/1974 | Armstrong et al. |
| 3,815,159 A | 6/1974 | Delaney et al. |
| 3,834,536 A | 9/1974 | Kelsey |
| 3,870,634 A | 3/1975 | Humphrey |
| 3,923,656 A | 12/1975 | Krebs et al. |
| 3,927,425 A | 12/1975 | Delaney et al. |
| 4,008,159 A | 2/1977 | Besik |
| 4,017,395 A | 4/1977 | Davis |
| 4,168,228 A | 9/1979 | Mallatt et al. |
| 4,172,034 A | 10/1979 | Carlsson et al. |
| 4,228,006 A | 10/1980 | Hanna |
| 4,315,509 A * | 2/1982 | Smit .................... 606/108 |
| 4,465,594 A | 8/1984 | Laak |
| 4,501,665 A | 2/1985 | Wilhelmson |
| 4,579,654 A | 4/1986 | Bremmer |
| 4,810,386 A | 3/1989 | Copa et al. |
| 4,812,237 A | 3/1989 | Cawley et al. |
| 4,940,539 A | 7/1990 | Weber |
| 5,080,786 A | 1/1992 | DeLima |
| 5,114,586 A | 5/1992 | Humphrey |
| 5,300,226 A | 4/1994 | Erickson |
| 6,554,996 B1 | 4/2003 | Rebori |

\* cited by examiner

*Primary Examiner*—Chester T. Barry
(74) *Attorney, Agent, or Firm*—Dunlap Codding & Rogers P.C.

(57) ABSTRACT

A collapsible water treatment digester includes a flexible bladder, a frame, and a plurality of filter plates. The flexible bladder is movable from a collapsed position wherein the bladder is folded into a substantially flattened state to an expanded position wherein the bladder forms a water treatment chamber. The frame is connected to the bladder so as to support the bladder in the expanded position. The filter plates are disposed within the water treatment chamber of the bladder so as to cause a substantial portion of the solids from a wastewater stream introduced into the water treatment chamber to produce a reconditioned water stream dischargeable from the bladder.

26 Claims, 5 Drawing Sheets

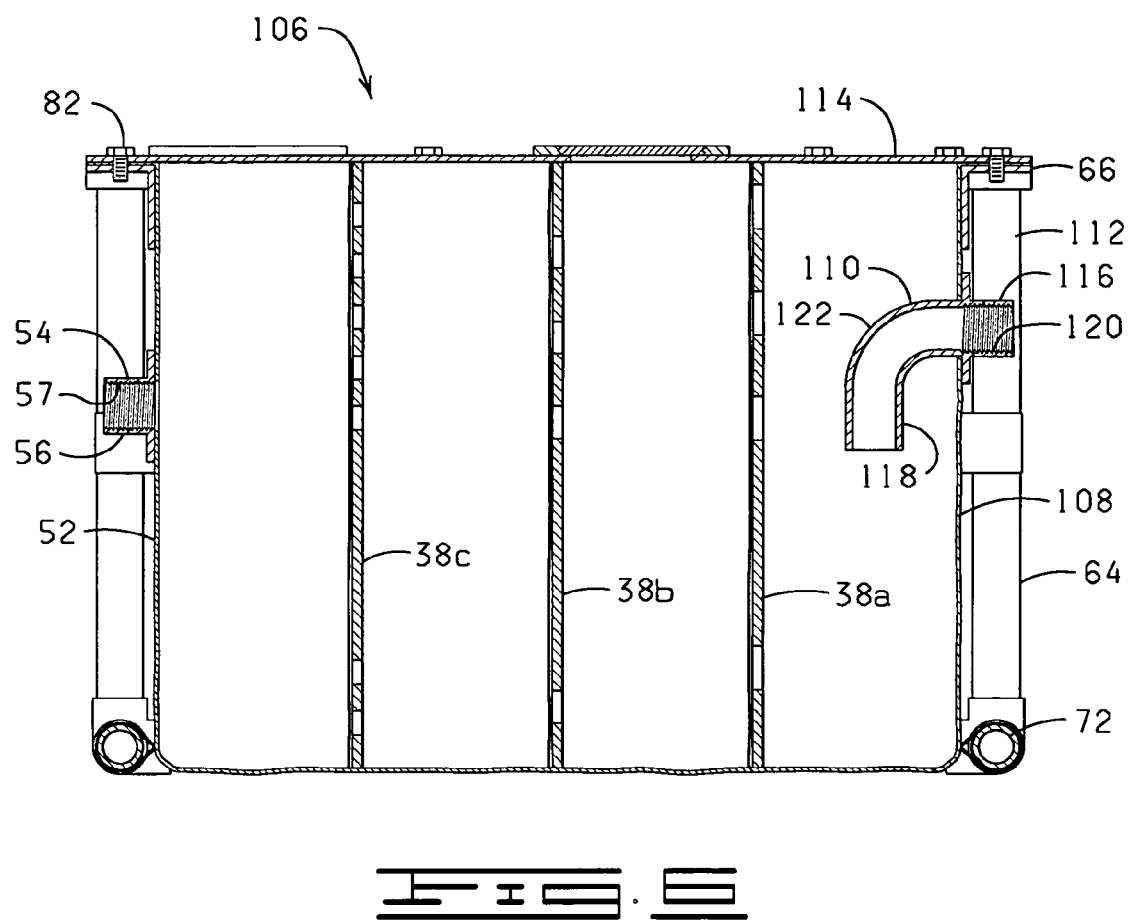

COLLAPSIBLE DIGESTER

CROSS-REFERENCE TO RELATED APPLICATIONS

This application is a continuation of U.S. Ser. No. 10/241,260, filed Sep. 10, 2002 now U.S. Pat No. 6,887,374, the entire contents of which are expressly incorporated herein by reference.

STATEMENT REGARDING FEDERALLY SPONSORED RESEARCH OR DEVELOPMENT

Not applicable.

BACKGROUND OF THE INVENTION

1. Field of the Invention

The present invention relates generally to a digester in a sanitation system, and more particularly, but not by way of limitation, to a collapsible digester.

2. Brief Description of the Related Art

Digesters are commonly utilized in sanitation systems to treat wastewater streams of black water and grey water. Black water is a wastewater that includes fecal matter and is discharged from a source, such as a toilet. Grey water is wastewater that is discharged from a shower, lavatory, dishwasher, or kitchen sink, and thus may include food or grease. Digesters are usually tanks or other vessels provided with baffles or filter plates to remove solids from the wastewater and provide a holding area where the biological activity of digestion occurs. Digestion is the biological decomposition of organic matter present in the biosolids of wastewater. The biosolids are digested under either aerobic or anaerobic conditions until the volatile content has been reduced to the point at which the solids are relatively inoffensive. Gases, such as carbon dioxide, methane, and hydrogen sulfide, are produced as the waste is digested.

Digesters have been constructed from various materials, such as concrete, steel, fiberglass, and plastic. A problem encountered with current digester construction is the amount of space required for shipping and storage. Because the digesters usually are formed from a rigid material and as one piece, they are incapable of being folded into a compact structure. This contributes to higher freight costs and additional storage requirements at warehouses and on installers' trucks.

To this end, a need exists for a wastewater digester which can be shipped and stored in a collapsed condition. It is to such a wastewater digester that the present invention is directed.

BRIEF SUMMARY OF THE INVENTION

The present invention is directed to a collapsible water treatment digester that includes a flexible bladder, a frame, and a plurality of filter plates. The flexible bladder is movable from a collapsed position wherein the bladder is folded into a substantially flattened state to an expanded position wherein the bladder forms a water treatment chamber. The frame is connected to the bladder so as to support the bladder in the expanded position. The filter plates are disposed within the water treatment chamber of the bladder so as to cause a substantial portion of the solids from a wastewater stream introduced into the water treatment chamber to produce a reconditioned water stream dischargeable from the bladder.

BRIEF DESCRIPTION OF THE SEVERAL VIEWS OF THE DRAWING

FIG. 6 is a cross sectional view of another embodiment of a collapsible digester constructed in accordance with the present invention.

DETAILED DESCRIPTION OF THE INVENTION

Figure 1:
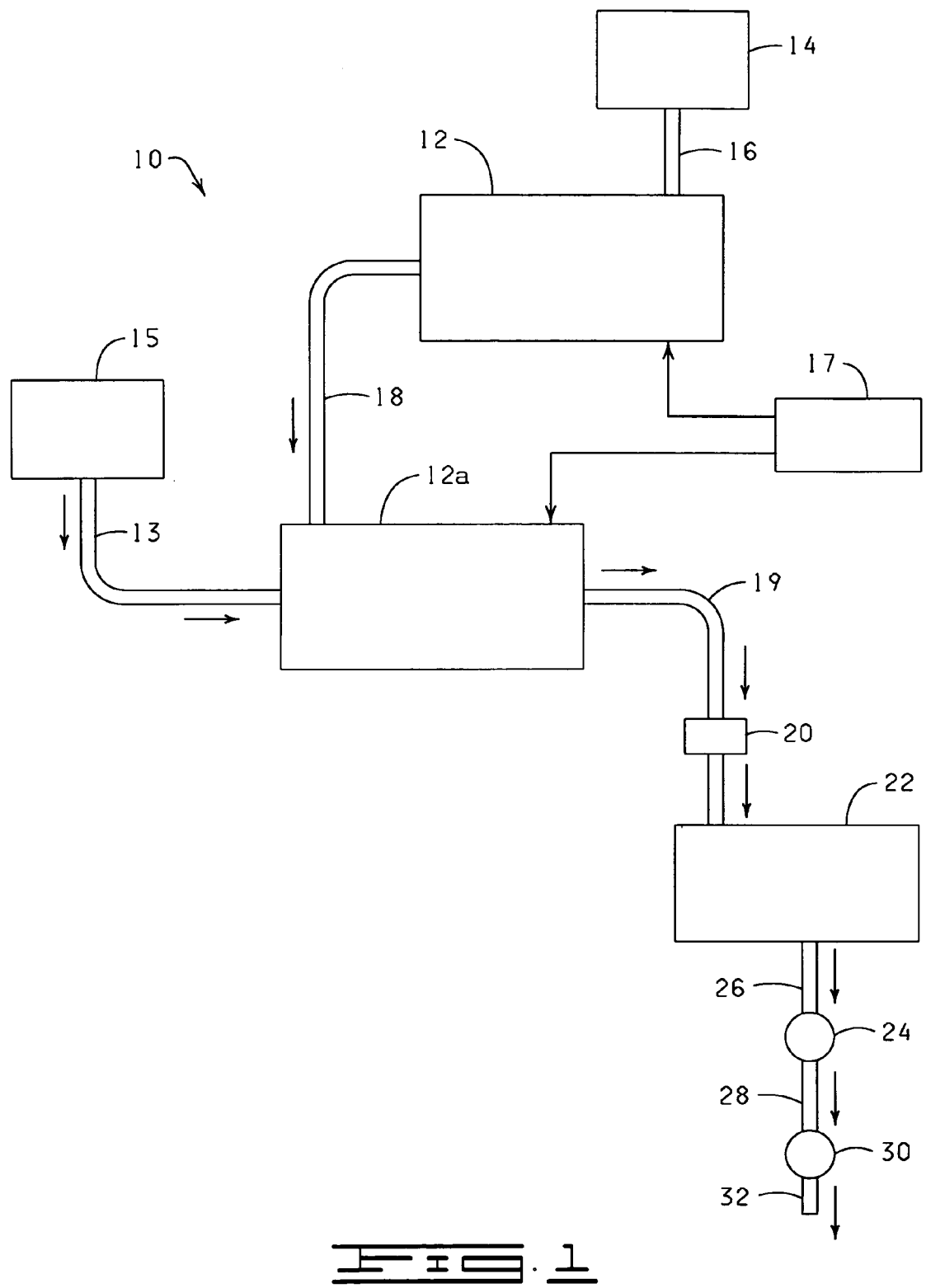
FIG. 1 is a schematic representation of a sanitation system having a collapsible digester constructed in accordance with the present invention.

Referring now to the drawings, and more particularly to FIG. 1, shown therein is a schematic representation of a wastewater sanitation system 10 having a collapsible digester 12 and a collapsible digester 12a, each constructed in accordance with the present invention. The wastewater sanitation system 10 is illustrated as being adapted to treat a black water stream discharged from a black water source 14, such as a toilet, and a grey water stream from a grey water source 15. It should be understood that additional digesters constructed in accordance with the present invention may be employed in a sanitation system like the wastewater sanitation system 10 to permit the treatment of a plurality of black water sources and grey water sources.

The black water source 14 is connected to the collapsible digester 12 via a conduit 16. When the black water source 14 is discharged, such as when a toilet is flushed, a black water stream flows through the conduit 16 and into the collapsible digester 12. A substantial portion of the solids present in the black water stream are removed by the collapsible digester 12 via filtration and aerobic digestion thereby providing a reconditioned water stream. To facilitate aerobic digestion of the solids present in the black water stream, the wastewater sanitation system 10 may include a pressurized air source 17 for injecting pressurized air into the collapsible digester 12 to facilitate aerobic digestion of the solids disposed in the collapsible digester 12. The air outputted by the pressurized air source 17 is injected into the collapsible digester 12, as indicated by the dashed-line with arrows in FIG. 1.

The reconditioned blackwater stream is withdrawn from the collapsible digester 12 and passed through a conduit 18 and into the digester 12a. The digester 12a functions to further treat the reconditioned black water stream and to receive and to treat the grey water received from the grey water source 15 via a conduit 13. The treated combined black and grey water is passed through a conduit 19, through a filter 20, and into a holding tank 22. The filter 20 contains activated carbon which filters and further treats the reconditioned water stream. In some applications, the filter 20 is eliminated and the treated black water stream passes directly from the collapsible digester 12 into the holding tank 22 where the reconditioned water stream is stored.

The holding tank 22 is connected via a conduit 26 to a pump 24 having an ON and OFF condition. In the ON condition, the pump 24 functions to withdraw a reconditioned water stream from the holding tank 22 through a conduit 28 and a chlorinator 30. The chlorinator 30 further treats the treated effluent with chlorine before being removed from the wastewater sanitation system 10 via a conduit 32 as a treated water stream. Continuous discharge of the treated effluent is not desirable in every situation. Thus, the holding tank 22 is provided with a means which, along with the pump 24, provides a means for discharging the treated effluent at periodic time intervals.

The operation of a sanitation system like the sanitation system 10 described herein is well known for the treatment of black water and grey water, as is exemplified in U.S. Pat. No. 5,114,586, which is expressly incorporated herein by reference. Thus, no further description of the operation of a wastewater sanitation system is deemed necessary in order for one of ordinary skill in the art to use the collapsible digesters 12 and 12a in a wastewater sanitation system.

The collapsible digesters 12 and 12a employed in the sanitation system 10 are similar in construction with the exception of the difference in the configurations of the filter plates used in each of the collapsible digesters 12 and 12a and the number of wastewater inlets. That is, the filter plate configurations may be modified from the collapsible digester 12 to the collapsible digester 12a because of the different type of wastewater being treated. Also, the collapsible digester 12a may be provided with more than one wastewater inlet to allow the collapsible digester 12a to receive the reconditioned black water stream and the grey water stream. Because of the similarity in construction between the collapsible digester 12 and 12a, only the collapsible digester 12 will be described in detail with reference to FIGS. 2–5.

Figure 2:
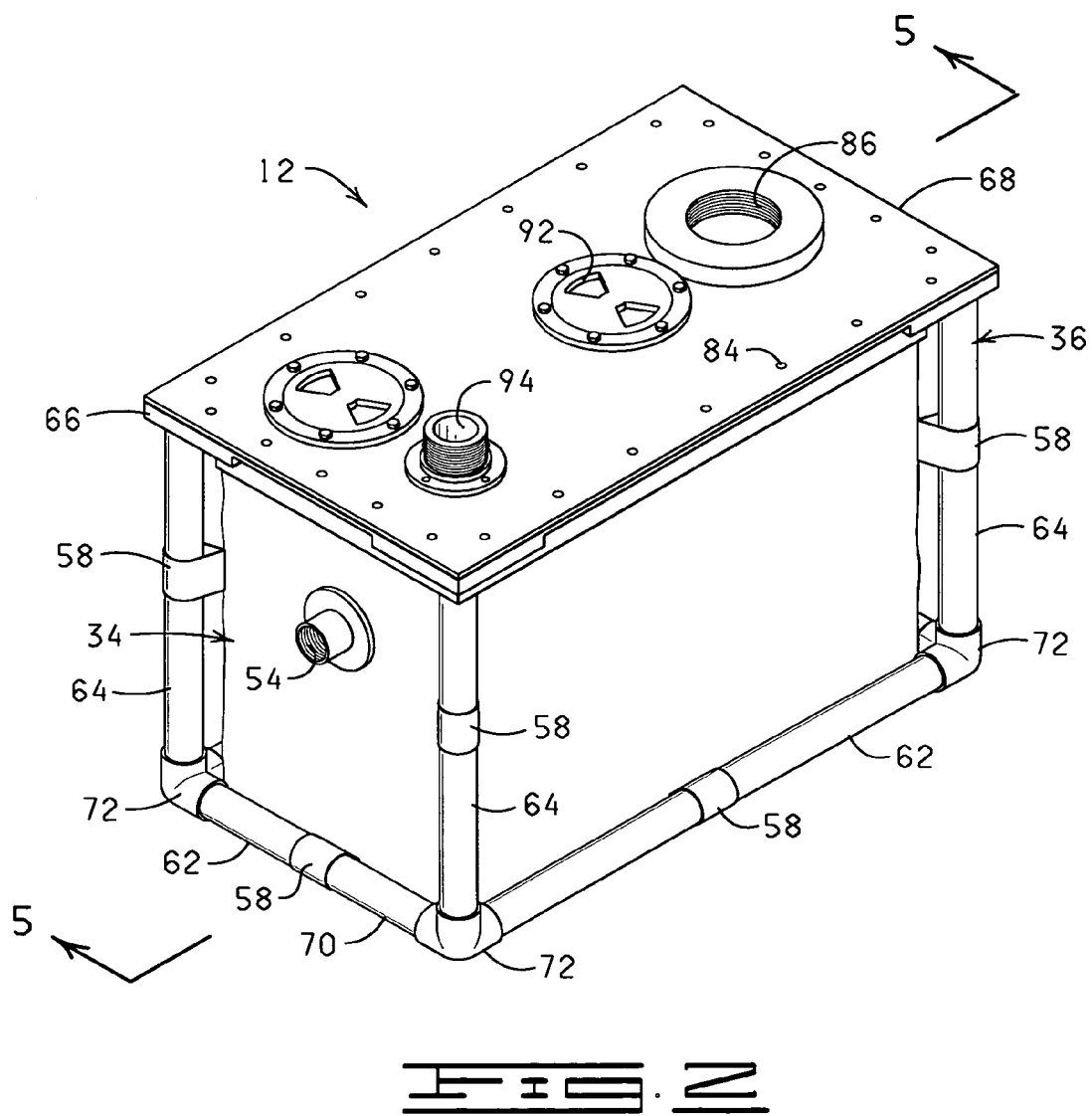
FIG. 2 is a perspective view of the collapsible digester constructed in accordance with the present invention.
Figure 3:
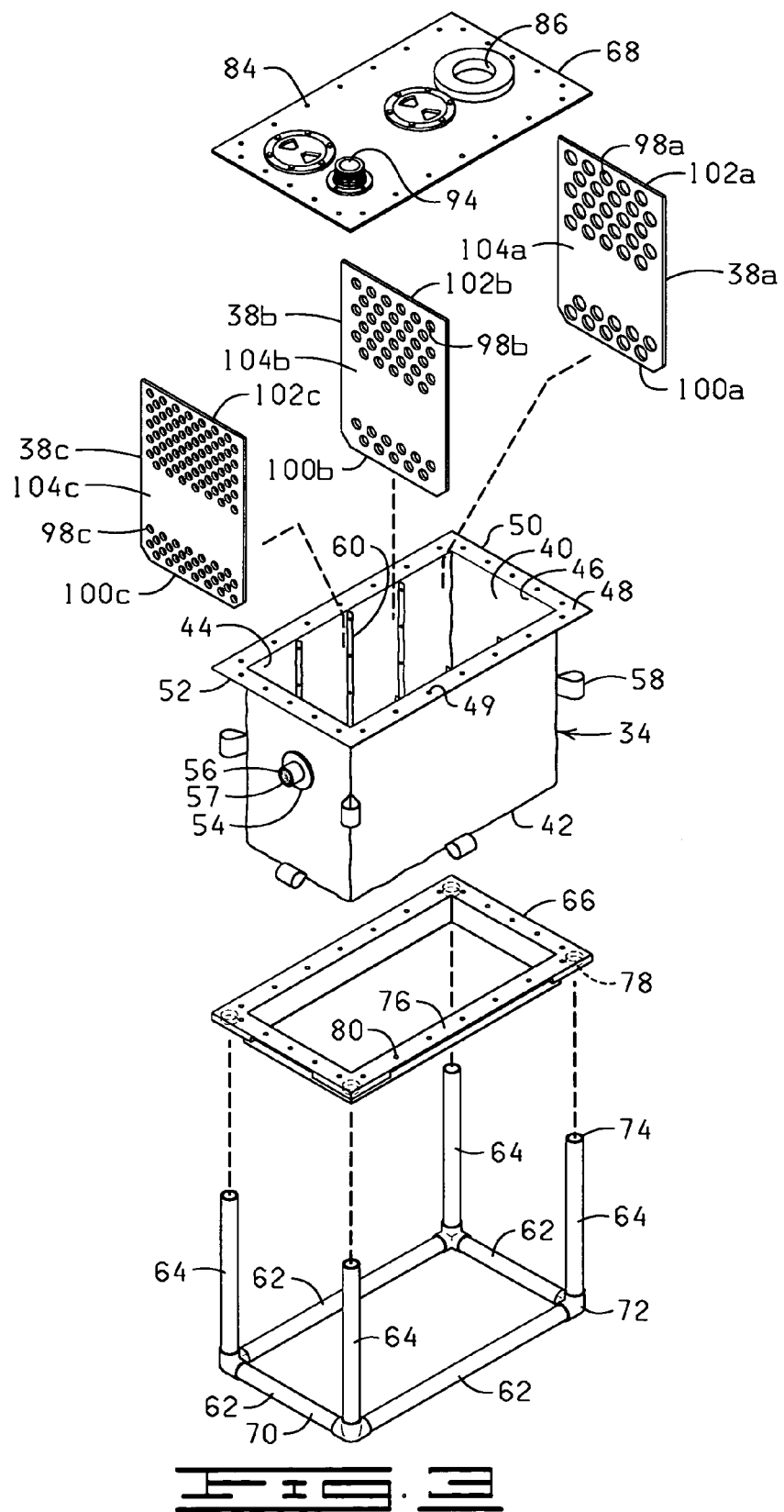
FIG. 3 is an exploded, perspective view of the collapsible digester of the present invention.

Referring now to FIGS. 2 and 3, the collapsible digester 12 includes a flexible bladder 34, a frame 36, and a plurality of filter plates 38a–38c (also commonly referred to as baffles). The flexible bladder 34 is movable from a collapsed position (FIG. 4) wherein the bladder 34 is folded into a substantially flattened state to an expanded position (FIGS. 2 and 3) wherein the bladder 34 forms a water treatment chamber 40. The frame 36 is connected to the bladder 34 so as to support the bladder 34 in the expanded position. The filter plates 38a–38c are disposed within the water treatment chamber 40 of the bladder 34 so as to cause a substantial portion of the solids from a wastewater stream introduced into the water treatment chamber 40 to produce a reconditioned water stream dischargeable from the bladder 34.

Figure 4:
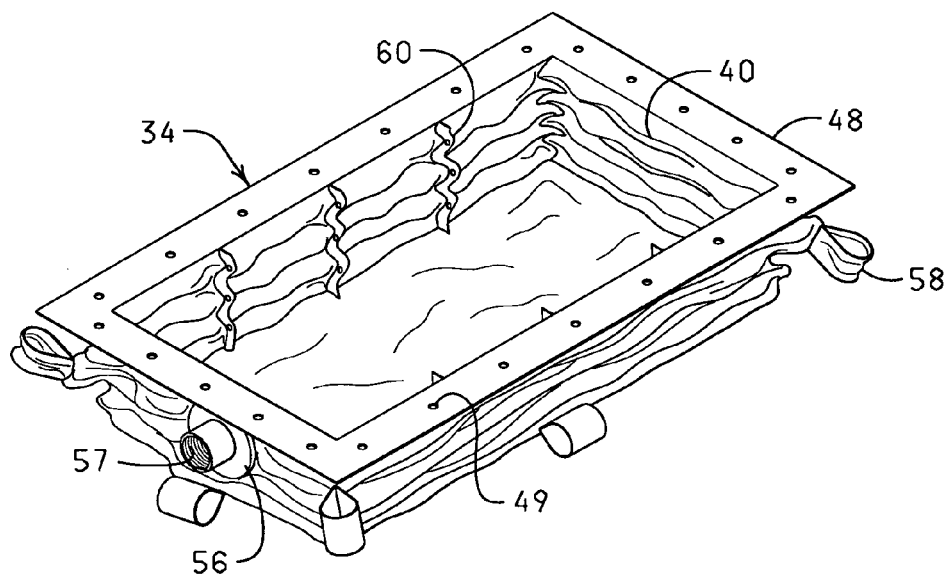
FIG. 4 is a perspective view of a bladder of the present invention shown in a collapsed position.

The bladder 34 is preferably constructed of a flexible, inelastic material which will provide a liquid and oxygen barrier and which is resistant to abrasion, chemical corrosion, and ultraviolet radiation. A suitable material is a modified vinyl based terpolymer, such as manufactured by Crestbury, Ltd. and sold under the trademark FLEXI-LINER®. The material preferably has a thickness greater than about 0.050 inches to reduce the possibility of damage to the bladder by puncture, and yet the thickness of the material must be such to permit the bladder 34 to be readily collapsed into a substantially flattened condition, as shown in FIG. 4, to facilitate shipping and storage. While the bladder 34 is illustrated herein as having a rectangular shape in the expanded condition, it should be appreciated that the bladder 34 can be constructed in a variety of other geometric shapes as well as sizes.

Referring to FIGS. 2 and 3, the bladder 34 is constructed generally to resemble an open-ended bag. To this end, the bladder 34 includes a closed lower end 42, a sidewall 44 extending from the lower end 42, and an open upper end 46. The upper end 46 of the bladder 34 is provided with a lip 48 extending outwardly about the circumference of the upper end 46 of the bladder 34 to facilitate attachment to the frame 36 in a manner to be described below. The lip 48 of the bladder 34 is provided with a plurality of spatially disposed holes 49 extending around the circumference of the lip 48.

Figure 5:
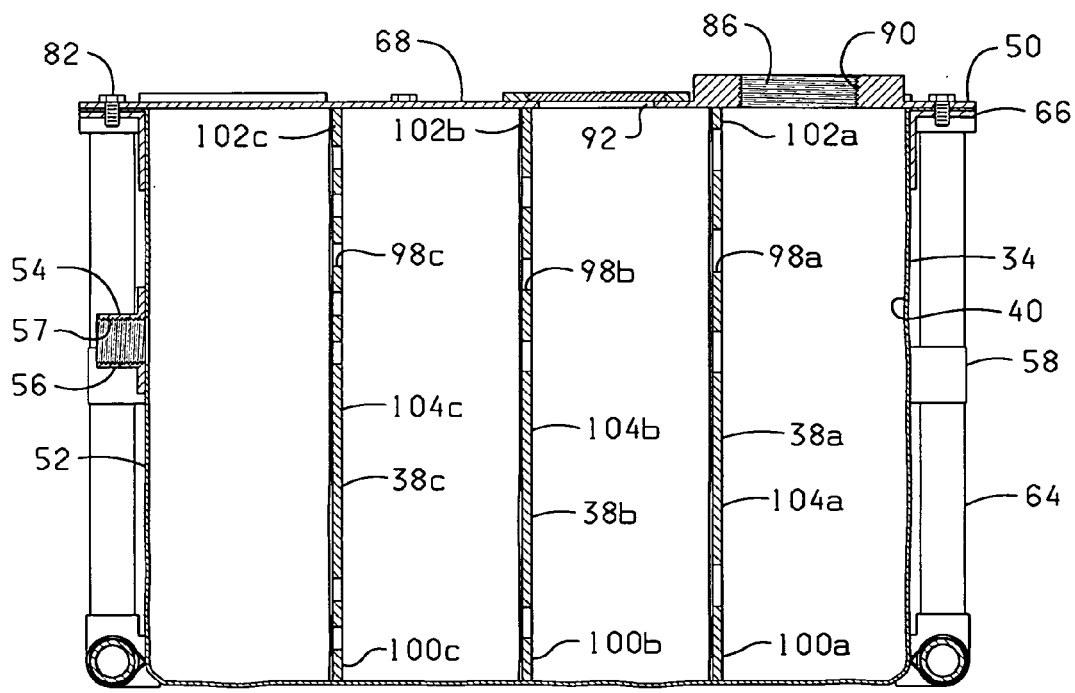
FIG. 5 is a cross sectional taken along line 5—5 in FIG. 2.

When in the expanded position, the closed lower end 42 and the sidewall 44 of the bladder 34 cooperate to form the water treatment chamber 40. The bladder 34 is characterized as having an inlet end 50 and an outlet end 52. As best shown in FIG. 5, the bladder 34 is provided with a treated water outlet 54 through the outlet end 52 of the bladder 34 that is in fluid communication with the water treatment chamber 40. The treated water outlet 54 is defined by a fitting 56 disposed through the sidewall 44 of the bladder 34 and secured thereto in a manner well known in the art. The fitting 56 is illustrated as being provided with a threaded male end 57 to permit a threaded connection to the conduit 18 (FIG. 1); however, it will be appreciated that a variety of fitting configurations can be used to form the treated water outlet 54.

The bladder 34 is further provided with a plurality of attachment loops 58 on the exterior surface of the bladder 34 and a plurality of flaps 60 (FIG. 3) extending from the interior surface of the bladder 34. As shown in FIG. 2, the attachment loops 58 are utilized to attach a portion of the bladder 34 to the frame 36 so that the bladder 34 is supported in the expanded position by the frame 36. The flaps 60 are provided in opposing pairs spaced along the length of the bladder 34 and extended from the lower end 42 to near the upper end 46 of the bladder 34. The flaps 60 provide a surface with which to secure the filter plates 38a–38c to the bladder 34 while maintaining the integrity of the bladder 34.

The frame 36 for supporting the bladder 34 in the expanded position includes a plurality of horizontal support members 62, a plurality of vertical support members 64, a flange member 66, and a lid 68. The horizontal support members 62 are positioned about the lower end 42 of the bladder 34 and connected to one another to form a support base 70. Each of the horizontal support members 62 is also insertable through a corresponding one of the attachment loops 58 of the bladder 34 for securing the lower end 42 of the bladder 34 to the horizontal support members 62.

The vertical support members 64 are spaced about the sidewall 44 of the bladder 34 and extend upwardly from the support base 70, and like the horizontal support members 62, the vertical support members 64 are insertable through a corresponding one of the attachment loops 58 of the bladder 34 for securing the sidewall 44 of the bladder 34 to the vertical support members 64. The horizontal support members 62 and the vertical support members 64 can be connected to one another using a plurality of fittings 72. A suitable fitting is one which is commonly referred to as a 90 degree elbow fitting with a side inlet.

The horizontal support members 62, the vertical support members 64, and the fittings 72 are preferably constructed of polyvinyl chloride (PVC) pipe; however, any lightweight, rigid material may be used. In addition, it is desirable that the horizontal support members 62, the vertical support members 64, and the fittings 72 be connectable to one another by merely sliding one end of the horizontal support member 62 and one end of the vertical support member 64 into a corresponding one of the fittings 72 so as not to require additional fasteners or adhesives to secure the horizontal and vertical support members 62 and 64 and thereby facilitate assembly.

The flange member 66 is supported on an upper end 74 of each of the vertical support members 64 and is configured to provide a continuous surface 76 for receiving the lip 48 of the bladder 34. An underside of the flange member 66 is provided with a plurality of recesses 78 (shown in phantom in FIG. 3) for slidingly receiving the upper end 74 of the vertical support members 64. The flange member 66 is further provided with a plurality of spatially disposed holes 80 extending around the circumference of the flange member 66. Each hole 80 serves to receive a fastener 82 (FIG. 5) for securing the lid 68 to the flange member 66. The flange member 66 is preferably constructed of a durable, lightweight material, such as plastic.

The lid 68 is a substantially flat plate sized to be positioned over the upper end 46 of the bladder 34 and connected to the flange member 66 with the upper end 46 of the bladder 34 positioned between the lid 68 and the flange member 66 so as to secure the upper end 46 of the bladder 34 between the lid 68 and the flange member 66. To this end, the lid 68 is provided with a plurality of holes 84 spatially disposed about the perimeter of the lid 68 so as to be alignable with the holes 80 of the flange member 66. As mentioned above, the lid 68 is secured to the flange member 66 with the fasteners 82 which are inserted through the holes 80 and 84 of the lid 68 and the flange member 66, respectively. Any suitable fastener may be utilized to secure the lid 68 to the flange member 66, such as a nut and bolt combination.

Referring now to FIG. 5, the lid 68 is further provided with an opening which forms a wastewater inlet 86. The wastewater inlet 86 is to be positioned near the inlet end 50 of the bladder 34 when the lid 68 is secured to the flange member 66 so as to be in fluid communication with the water treatment chamber 40 of the bladder 34 such that the wastewater stream can be introduced into the water treatment chamber 40 near the inlet end 50 of the bladder 34. The waste water inlet 86 is illustrated as being provided with internal threads 90 to permit a threaded connection to the conduit 16 (FIG. 1); however, it will be appreciated that a variety of fitting configurations can be used to form the wastewater inlet 86.

The lid 68 is also provided with a plurality of openings 92 provided with removable caps. Upon removal of the caps, the openings 92 provide access to the water treatment chamber 40 of the bladder 34 to permit the introduction of a biological activator and to permit periodic cleaning of the water treatment chamber 40 and the filter plates 38a–38c without requiring the collapsible digester 12 to be disassembled. The lid 68 also includes an opening 94 to permit the connection of the pressurized air source 17 (FIG. 1) to the collapsible digester 12.

While the horizontal support members 62, the vertical support members 64, the flange member 66, and the lid 68 are illustrated as forming the frame 36 for supporting the bladder 34 in the expanded position, it should be appreciated that the frame 36 can be constructed from a variety of rigid external and internal support structures capable of assembly and disassembly. For example, the bladder 34 can be supported by a series of rods or bars connected to support the bladder 34 in the expanded position. Tabs may be formed on an exterior surface of the bladder 34 extending the length of the bladder so as to hold the rods or cross members. However, hook and loop attached to the exterior surface of the bladder 34 may also be used. Additionally, hinged panels, rather than rods, formed in a box-like structure, may be utilized to support and encase the bladder 34. A rim structure, such as the flange member 66, may be connected to the upper cross members or panels by adhesive, bolts, clips, or any other suitable fastener.

Another example of a frame suitable for supporting the bladder 34 utilizes bars positioned in the interior of the bladder 34 at the lower end 42 thereof, thus allowing gravity to hold the shape of the bladder 34. The bladder 34 would be vertically supported by a plurality of vertical support members positioned on the exterior of the bladder 34 and having an upper end connected to the rim structure and a lower end engageable on a ground support, such as a foundation, or a cross member.

The filter plates 38a–38c are spatially disposed in the water treatment chamber 40 of the collapsible bladder 34 of the collapsible digester 12. Each of the filter plates 38a–38c are attached to a corresponding pair of the flaps 60 provided on the interior surface of the bladder 34. The filter plates 38a–38c can be attached to the flaps 60 with any suitable connector, such as a plastic or wire tie (not shown).

Each of the filter plates 38a–38c is shown to be a flat plate constructed of a durable, lightweight material, such as a polyethylene or some other suitable polymeric material. Each of the filter plates 38a–38c is provided with a plurality of openings 98a–98c, respectively, through select portions thereof. A portion of the openings 98a–98c are shown to be formed through a lower portion 100a–100c of the filter plates 38a–38c and a portion of the openings 98a–98c are shown to be formed through an upper portion 102a–102c of the filter plates 38a–38c with those openings formed through the upper portion 102a–102c being spaced from those openings 98a–98c formed through the lower portion 100a–100c of the filter plates 38a–38c so as to form a baffle surface 104a–104c. Additionally, the size of the openings 98a–98c are illustrated as decreasing in size from the filter plate 38a to the filter plate 38c.

Upon a wastewater stream being introduced into the wastewater treatment chamber 40 of the bladder 34 via the wastewater inlet 86, the filter plates 38a–38c function to breakup and separate a substantial portion of the solids from the wastewater stream while allowing the wastewater to pass from the inlet end 50 of the bladder 34 to the outlet end 52 of the bladder 34 wherein a reconditioned water stream may be discharged from the wastewater treatment chamber 40 via the treated water outlet 54. It will be appreciated by those of ordinary skill in the art that the filter plates 38a–38c described above are an example of the types of filter plates that can be employed in the collapsible digesters 12 and 12a to separate solids from the wastewater stream depending on the type of wastewater being treated (black water or grey water). It will further be appreciated that the number of filter plates used may be modified, as well as the location and pattern of the openings formed in the filter plates. In addition, the process of separating solids from the wastewater stream and digesting the separated solids in a digester is well known in the art. Such a process of separation and digestion is described in U.S. Pat. No. 5,114,586, which has been incorporated by reference herein. Thus, no further description of the construction or arrangement of the filter plates or of the separation and digestion process is believed necessary in order for one skilled in the art to construct and operate the collapsible digesters 12 and 12a of the present invention.

As mentioned above, one of the advantages of the collapsible digester 12 of the present invention is that the construction of each of the components described above permits the collapsible digester 12 to be packaged, and thus shipped and stored, in a relatively compact state. That is, the bladder 34 is capable of being folded into a substantially flattened state. FIG. 4 illustrates an example of how the bladder 34 may be folded in an accordion fashion. However, it will be understood that the flexibility of the bladder 34 will allow the bladder 34 to be folded in a variety of ways to achieve a flattened state, such as in a manner similar to the folding of a paper grocery bag. The construction of the frame 36 and the filter plates 38a–38c further contributes to the ability to be packaged in a compact state and the ability to quickly and easily assemble the collapsible digester 12 when desired.

To assemble the collapsible digester 12, the bladder 34 is unfolded to the expanded position, as illustrated in FIG. 3. With the bladder 34 in the expanded position, the horizontal support members 62 are inserted in a corresponding one of the attachment loops 58 extending from the lower end 42 of the bladder 34. The horizontal support members 62 are then connected to one another with the fittings 72 to form the support base 70. The vertical support members 64 are next inserted in a corresponding one of the attachment loops 58 extending from the sidewall 44 of the bladder 34. The vertical support members 64 are inserted into the fittings 72 to connect the vertical support members 64 to the horizontal support members 62. The flange member 66 is next positioned on the upper ends 74 of the vertical support members 64 with the upper ends 74 of the vertical support members 64 received in the recesses 78 of the flange member 66. The filter plates 38a–38c are then disposed in the water treatment chamber 40 of the bladder 34 and connected to a corresponding pair of the flaps 60 with a fastener (not shown).

Prior to securing the lid 68 to the flange member 66, a sealant (not shown), such as silicone, is applied to the upper surface of the lip 48 of the bladder 34 with the lip 48 positioned on the continuous surface 76 of the flange member 66. Finally, the lid 68 is positioned over the water treatment chamber 40 of the bladder 34 and secured to the flange member 66 with the fasteners 82. The lip 48 of the bladder 34 is positioned between the lid 68 and the flange member 66 as the lid 68 is positioned on the flange member 66 whereby the lip 48 of the bladder 34 is secured between the flange member 66 and the lid 68 upon the lid 68 being connected to the flange member 66. Because of the inelasticity of the bladder 34, securing the lip 48 of the bladder 34 between the lid 68 and the flange member 66 further causes the bladder 34 to hold the frame 36 in an assembled condition. The sealant forms a watertight seal between the lid 68 and the lip 48 of the bladder 34 so that the collapsible digester 12 is watertight and ready for installation into a sanitation system, such as the wastewater sanitation system 10.

FIG. 6 illustrates another embodiment of a collapsible digester 106 constructed in accordance with the present invention. In FIG. 6, like numerals will be used to designate like components relative to the collapsible digester 12, shown in FIGS. 2–5. The collapsible digester 106 is similar in construction to the collapsible digester 12 described above with the exception that the collapsible digester 106 includes a bladder 108 provided with a wastewater inlet 110 in an inlet end 112 of the bladder 108, as opposed to being formed in the lid 68 as described relative to the collapsible digester 12. Accordingly, the collapsible digester 106 further includes a lid 114 which is void of a wastewater inlet.

The wastewater inlet 110 is defined by a fitting 116 disposed through a sidewall 118 of the bladder 108 and secured thereto in a manner well known in the art. The fitting 116 is illustrated as being provided with a threaded female portion 120 to permit a threaded connection to the conduit 16 (FIG. 1) and having an elbow portion 122 so as to direct the wastewater stream introduced into the bladder 108 in a downward direction. However, it will be appreciated that a variety of fitting configurations can be used to form the treated wastewater inlet 110.

It should be appreciated that a bladder like the bladder 108 of the collapsible digester 106 can be used with a lid like the lid 68 of the collapsible digester 12 to form a collapsible digester provided with two wastewater inlets, such as may be employed in a collapsible digester like the collapsible digester 12a to treat a combination of black water and grey water.

From the above description, it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and as defined in the appended claims.

What is claimed is:

1. A water treatment digester, comprising:
   a flexible bladder having a closed lower end, a sidewall extending from the closed lower end, and a treated water outlet extending through the bladder, the lower end and the sidewall of the bladder cooperating to form a water treatment chamber;
   a frame connected to the bladder to support the bladder, the frame having a wastewater inlet in fluid communication with the water treatment chamber of the bladder such that a wastewater stream can be introduced into the water treatment chamber; and
   at least one filter plate disposed in the water treatment chamber so as to cause solids to be removed from the wastewater stream introduced into the water treatment chamber of the bladder and thereby produce a reconditioned water stream dischargeable from the bladder via the treated water outlet of the bladder.

2. The water treatment digester of claim 1 further comprising:
   means for inputting pressurized air into the water treatment chamber of the bladder to promote aerobic digestion of the solids removed from the wastewater stream.

3. The water treatment digester of claim 1 wherein the bladder has an open upper end, and wherein the frame comprises:
   a plurality of horizontal support members positioned about the lower end of the bladder and connected to one another to form a support base, the lower end of the bladder being secured to each of the horizontal support members;
   a plurality of vertical support members spaced about the sidewall of the bladder and extending upwardly from the support base, the sidewall of the bladder being secured to each of the vertical support members;
   a flange member supported on an upper end of the vertical support members and extending about the upper end of the bladder, the flange member adapted to receive the upper end of the bladder; and
   a lid positioned over the upper end of the bladder and connected to the flange member with the upper end of the bladder positioned between the lid and the flange member so as to secure the upper end of the bladder between the lid and the flange member.

4. The water treatment digester of claim 3 wherein the lid is provided with an opening which forms the wastewater inlet.

5. The water treatment digester of claim 4 wherein the lid further includes at least one access opening to facilitate cleaning of the water treatment chamber.

6. The water treatment digester of claim 3 wherein the bladder includes a plurality of attachment loops extending from an exterior surface thereof for receiving the horizontal support members and the vertical support members.

7. The water treatment digester of claim 1 wherein the filter plate is connected to a pair of corresponding flaps extending from the interior surface of the bladder.

8. A water treatment water treatment digester, comprising:
a flexible bladder having a closed lower end, a sidewall extending from the closed lower end, a wastewater inlet, and a treated water outlet, the lower end and the sidewall of the bladder cooperate to form a water treatment chamber, the wastewater inlet of the bladder being in fluid communication with the water treatment chamber of the bladder such that a wastewater stream can be introduced into the water treatment chamber of the bladder;
a frame connected to the bladder so as to support the bladder; and
at least one filter plate disposed in the water treatment chamber of the bladder so as to cause solids to be removed from the wastewater stream introduced into the water treatment chamber via the wastewater inlet and thereby produce a reconditioned water stream dischargeable from the bladder via the treated water outlet of the bladder.

9. The water treatment digester of claim 8 further comprising:
means for inputting pressurized air into the water treatment chamber of the bladder to promote aerobic digestion of the solids removed from the wastewater stream.

10. The water treatment digester of claim 8 wherein the bladder has an open upper end, and wherein the frame comprises:
a plurality of horizontal support members positioned about the lower end of the bladder and connected to one another to form a support base, the lower end of the bladder being secured to each of the horizontal support members;
a plurality of vertical support members spaced about the sidewall of the bladder and extending upwardly from the support base, the sidewall of the bladder being secured to each of the vertical support members;
a flange member supported on an upper end of the vertical support members and extending about the upper end of the bladder, the flange member adapted to receive the upper end of the bladder; and
a lid positioned over the upper end of the bladder and connected to the flange member with the upper end of the bladder positioned between the lid and the flange member so as to secure the upper end of the bladder between the lid and the flange member.

11. The water treatment digester of claim 10 wherein the lid further includes at least one access opening to facilitate cleaning of the water treatment chamber.

12. The water treatment digester of claim 10 wherein the bladder includes a plurality of attachment loops extending from an exterior surface thereof for receiving the horizontal support members and the vertical support members.

13. The water treatment digester of claim 8 wherein the filter plate is connected to a pair of corresponding flaps extending from the interior surface of the bladder.

14. A method of making a water treatment digester, comprising:
providing a flexible bladder having a closed lower end, a sidewall extending from the closed lower end, and a treated water outlet extending through the outlet end of the bladder, the lower end and the sidewall of the bladder cooperate to form a water treatment chamber;
connecting the bladder to a frame so as to support the bladder, the frame having a wastewater inlet in fluid communication with the water treatment chamber of the bladder such that a wastewater stream can be introduced into the water treatment chamber; and
disposing at least one filter plate into the water treatment chamber of the bladder so that the plate is capable of removing solids from the wastewater stream introduced into the bladder to produce a reconditioned water stream dischargeable from the bladder via the treated water outlet of the bladder.

15. The method of claim 14 further comprising:
inputting pressurized air into the water treatment chamber of the bladder to promote aerobic digestion of the solids removed from the wastewater stream.

16. The method of claim 14 wherein the step of connecting the bladder to the frame further comprises:
positioning a plurality of horizontal support members about the lower end of the bladder and connecting the horizontal support members to one another to form a support base;
attaching the lower end of the bladder to each of the horizontal support members;
positioning a plurality of vertical support members about the sidewall of the bladder and extending the vertical support members upwardly from the support base;
attaching the sidewall of the bladder to each of the vertical support members;
positioning a flange member on an upper end of the vertical support members so that the flange member extends about an upper end of the bladder, the flange member adapted to receive the upper end of the bladder; and
positioning a lid over the upper end of the bladder and connecting the lid to the flange member with the upper end of the bladder positioned between the lid and the flange member so as to secure the upper end of the bladder between the lid and the flange member.

17. The method of claim 16 wherein the lid is provided with an opening which forms the wastewater inlet.

18. The method of claim 16 wherein the lid further includes at least one access opening to facilitate cleaning of the water treatment chamber.

19. The method of claim 16 wherein the bladder is attached to the horizontal support members and the vertical support members via a plurality of attachment loops extending from an exterior surface of the bladder.

20. The method of claim 14 wherein the filter plate is connected to a pair of corresponding flaps extending from the interior surface of the bladder.

21. A method of making a water treatment digester, comprising:
providing a flexible bladder having a closed lower end, a sidewall extending from the closed lower end, a wastewater inlet, and a treated water outlet;
supporting the bladder so that the lower end and the sidewall of the bladder cooperate to form a water treatment chamber, the wastewater inlet of the bladder being in fluid communication with the wastewater inlet such that a wastewater stream can be introduced into the water treatment chamber; and
disposing at least one filter plate into the water treatment chamber of the bladder so that the plate is capable of removing solids from the wastewater stream introduced into the bladder to produce a reconditioned water stream dischargeable from the bladder via the treated water outlet of the bladder.

22. The method of claim 21 further comprising:

attaching a means for inputting pressurized air into the water treatment chamber of the bladder to promote aerobic digestion of the solids removed from the wastewater stream.

23. The method of claim 21 wherein the step of supporting the bladder further comprises:

positioning a plurality of horizontal support members about the lower end of the bladder and connecting the horizontal support members to one another to form a support base;

attaching the lower end of the bladder to each of the horizontal support members;

positioning a plurality of vertical support members about the sidewall of the bladder and extending the vertical support members upwardly from the support base;

attaching the sidewall of the bladder to each of the vertical support members;

positioning a flange member on an upper end of the vertical support members so that the flange member extends about an upper end of the bladder, the flange member adapted to receive the upper end of the bladder; and positioning a lid over the upper end of the bladder and connecting the lid to the flange member with the upper end of the bladder positioned between the lid and the flange member so as to secure the upper end of the bladder between the lid and the flange member.

24. The method of claim 23 wherein the lid further includes at least one access opening to facilitate cleaning of the water treatment chamber.

25. The method of claim 23 wherein the bladder is attached to the horizontal support members and the vertical support members via a plurality of attachment loops extending from an exterior surface of the bladder.

26. The method of claim 21 wherein the filter plate is connected to a pair of corresponding flaps extending from the interior surface of the bladder.

\* \* \* \* \*